(12) United States Patent
Vehmas

(10) Patent No.: US 8,650,911 B2
(45) Date of Patent: Feb. 18, 2014

(54) METHOD AND APPARATUS FOR HEATING GLASS

(71) Applicant: Uniglass Engineering Oy, Ylojarvi (FI)

(72) Inventor: Jukka Vehmas, Tampere (FI)

(73) Assignee: Uniglass Engineering Oy, Ylojarvi (FI)

( * ) Notice: Subject to any disclaimer, the term of this patent is extended or adjusted under 35 U.S.C. 154(b) by 0 days.

(21) Appl. No.: 13/915,969

(22) Filed: Jun. 12, 2013

(65) Prior Publication Data

US 2013/0291600 A1    Nov. 7, 2013

Related U.S. Application Data

(62) Division of application No. 10/864,878, filed on Jun. 9, 2004, now Pat. No. 8,479,540.

(30) Foreign Application Priority Data

Jun. 24, 2003  (FI) ..................................... 20030936

(51) Int. Cl.
*C03B 27/044*   (2006.01)

(52) U.S. Cl.
USPC .................. 65/355; 65/356; 65/349; 65/350; 65/111; 65/119; 65/114

(58) Field of Classification Search
USPC .................. 65/111, 114, 117, 350, 355, 356; 432/21, 57, 152, 176; 219/388, 400
See application file for complete search history.

(56) References Cited

U.S. PATENT DOCUMENTS

| | | | |
|---|---|---|---|
| 3,923,449 A * | 12/1975 | Brock | 432/59 |
| 4,059,426 A * | 11/1977 | Starr | 65/25.2 |
| 4,059,427 A * | 11/1977 | Starr et al. | 65/25.2 |
| 4,200,446 A * | 4/1980 | Koontz | 65/25.3 |
| 4,390,359 A * | 6/1983 | Reunamaki | 65/114 |
| 4,481,025 A * | 11/1984 | Rodriguez et al. | 65/348 |
| 4,529,380 A | 7/1985 | McMaster | |
| 4,534,780 A * | 8/1985 | Cemin | 65/348 |
| 4,620,864 A * | 11/1986 | McMaster | 65/114 |
| 4,681,616 A * | 7/1987 | McMaster | 65/114 |
| 4,738,705 A * | 4/1988 | McMaster | 65/119 |
| 4,824,464 A | 4/1989 | Perin et al. | |
| 5,110,338 A * | 5/1992 | McMaster | 65/182.2 |
| 5,735,924 A * | 4/1998 | Kormanyos | 65/111 |
| 5,746,799 A * | 5/1998 | Kormanyos | 65/111 |
| 5,762,677 A * | 6/1998 | Kormanyos | 65/111 |
| 5,951,734 A * | 9/1999 | Friedel et al. | 65/118 |
| 6,279,349 B1 * | 8/2001 | Schnabel, Jr. | 65/111 |
| 6,282,923 B1 * | 9/2001 | Vehmas | 65/114 |

(Continued)

FOREIGN PATENT DOCUMENTS

| EP | 0897896 | 2/1998 |
|---|---|---|
| EP | 1 184 346 | 3/2002 |

(Continued)

*Primary Examiner* — Jason L Lazorcik
(74) *Attorney, Agent, or Firm* — Ladas & Parry LLP

(57) ABSTRACT

Glass is heated from above and below while the glass resides on rolls (3) in a tempering furnace (1). The upper surface of the glass (4) is heated by hot air jets formed by sucking air from inside the furnace (1) and pressurizing the hot air and recycling it back to the upper surface of the glass. Air which has been taken from outside the furnace (1) and pressurized by a compressor (17) and heated is blown to the lower surface of the glass.

5 Claims, 2 Drawing Sheets

(56) References Cited

U.S. PATENT DOCUMENTS

| | | | |
|---|---|---|---|
| 6,427,488 B1* | 8/2002 | Vitkala et al. | 65/29.19 |
| 6,470,711 B1* | 10/2002 | Jarvinen et al. | 65/273 |
| 6,668,590 B2* | 12/2003 | Lewandowski | 65/111 |
| 6,776,008 B1* | 8/2004 | Vehmas et al. | 65/119 |
| 6,783,358 B1* | 8/2004 | Lewandowski et al. | 432/144 |
| 6,845,633 B2* | 1/2005 | Vitkala | 65/29.19 |
| 6,881,931 B2* | 4/2005 | Vehmas et al. | 219/400 |
| 7,127,918 B2* | 10/2006 | Vitkala et al. | 65/115 |
| 8,479,540 B2* | 7/2013 | Vehmas | 65/111 |
| 2002/0134109 A1* | 9/2002 | Vitkala | 65/29.15 |
| 2003/0061834 A1 | 4/2003 | Vitkala et al. | |
| 2004/0232135 A1* | 11/2004 | Vehmas et al. | 219/400 |
| 2004/0261457 A1* | 12/2004 | Vehmas | 65/29.19 |
| 2013/0291600 A1* | 11/2013 | Vehmas | 65/356 |

FOREIGN PATENT DOCUMENTS

| | | |
|---|---|---|
| EP | 1184346 | 3/2002 |
| EP | 1 241 143 | 9/2002 |
| EP | 1 279 645 | 1/2003 |
| EP | 1279645 | 1/2003 |
| EP | 0897896 | 3/2003 |
| EP | 1 298 096 | 4/2003 |
| FI | 109292 | 5/2001 |
| FI | 107802 | 10/2001 |
| FI | 100596 | 9/2002 |
| WO | 9744283 | 11/1997 |
| WO | 01/32570 | 5/2001 |
| WO | 0132570 | 5/2001 |

* cited by examiner

METHOD AND APPARATUS FOR HEATING GLASS

RELATED APPLICATION

This is a divisional of application Ser. No. 10/864,878 filed on Jun. 9, 2004, claims the benefit thereof, and incorporates the same by reference.

BACKGROUND OF THE INVENTION

The invention relates to a method of heating glass, the method comprising conveying glass through a tempering furnace so that the glass is heated from above and below, an upper surface of the glass being heated by hot air jets formed by sucking air from inside the furnace and pressurizing the hot air and recycling it back to the upper surface of the glass.

The invention further relates to an apparatus for heating glass, the apparatus comprising a tempering furnace comprising horizontal rolls arranged to carry the glass and to form a conveyor thereof, an upper side return pipe for sucking air from inside the tempering furnace, a pressurization unit for pressurizing the air sucked from inside the tempering furnace, and means for blowing the pressurized air back to an upper surface of the glass.

A problem involved in heating glass using an oscillating roll furnace is that the edges of the glass tend to curve upwards at the beginning of the heating. This is due to the large heat flow received by the lower surface of the glass at the beginning of a heating cycle, caused by the ceramic rolls used in the furnace, compared to the heat flow received by the upper surface of the glass. As a result, the edges of the glass curve upwards while the middle area of the glass tends to suffer from optical errors; in addition, the glass heats up unevenly. When heating selectivity glass, the situation is particularly difficult since selectivity glass reflects thermal radiation extremely strongly. Glass with a selective surface is usually heated with the selective surface upwards, so it is difficult to heat the upper surface of the glass in particular, compared to heating the lower surface thereof. In such a case, the heating times for selective glass are, of course, considerably longer than those for common clear glass; therefore, when heating selective glass, the capacity of a furnace is typically quite low.

WO publication 97/44283 discloses a solution wherein the underneath surfaces of glass are cooled at the beginning of a heating cycle. Furthermore, heat transfer on the underside is enhanced towards the end of the heating cycle by blowing hot air directly to the lower surface of the glass. The solution is extremely effective and well-working but, when heating selective glass in particular, it would be advantageous if the heating time could be shortened.

WO publication 01/32570 discloses a solution wherein glass is heated such that air is blown to the upper surface of the glass in order to heat the glass. The blown air is sucked from inside a tempering furnace, so it is already hot. The sucked hot air is pressurized and recycled back by blowing it through a pipe system to the vicinity of the upper surface of the glass, substantially perpendicularly to the upper surface thereof. The lower surface of the glass is also heated in a similar manner by hot air jets that are produced by taking air from inside the furnace and recycling the hot air back after pressurization. The solution works extremely well when heating selective glass. The solution enables the heating time for selective glass to be reasonably short. However, the structure of hot air pressurization devices is rather complex and therefore quite expensive. Furthermore, thermal expansions caused by the blowing of hot air set strict requirements for the structure of blowpipe systems, which makes such blowpipe systems quite complex and expensive.

BRIEF DESCRIPTION OF THE INVENTION

An object of the present invention is to provide an improved method and apparatus for heating glass.

The method of the invention is characterized in that air which has been taken from outside the furnace and which has been pressurized by a compressor and heated is blown to a lower surface of the glass.

Furthermore, the apparatus of the invention is characterized in that the apparatus comprises a compressor for pressurizing air taken from outside the furnace, a pipe system for conveying the air pressurized by the compressor to a lower surface of the glass, and means for heating the air pressurized by the compressor.

The idea underlying the invention is that glass is heated from above and below while the glass resides on rolls in a tempering furnace. The upper surface of the glass is heated by hot air jets formed by sucking air from inside the furnace and pressurizing the hot air and recycling it back to the upper surface of the glass. Furthermore, air which has been taken from outside the furnace and which has been pressurized by a compressor and heated is blown to the lower surface of the glass.

The idea underlying an embodiment is that blowing on the underside takes place such that it ends before the heating cycle ends, and lasts maximally for 60% of the entire heating time. The idea underlying a second embodiment is that during the blowing on the underside, electric resistors heating the underside are controlled to heat such that the heating effect provided by the electric resistors is increased when the blowing starts, and for the rest of the duration of the heating cycle, the electric resistors are controlled by thermoelements such that the temperature of the glass follows a predetermined heating curve.

An advantage of the invention is that a solution is achieved which also enables selective glass to be heated reasonably quickly; in addition, the structure of the apparatus is reasonably simple. Convection blowing on the upper side enables coated glass reflecting thermal radiation to be heated in a controlled manner. Heating blowing on the underside enables quite a high heating rate to be achieved. Furthermore, the temperature at the bottom part of the furnace can be kept quite low if the blowing on the underside is used in the middle of the heating cycle when the heat flow from the rolls of the furnace is decreasing but the underside of the glass needs more heat. Heat is supplied at the exactly correct moment, and the general temperature at the bottom part of the furnace does not have to be raised in a continuous load situation.

BRIEF DESCRIPTION OF THE DRAWINGS

The invention is described in closer detail in the accompanying drawings, in which.

DETAILED DESCRIPTION OF THE INVENTION

Figure 1:
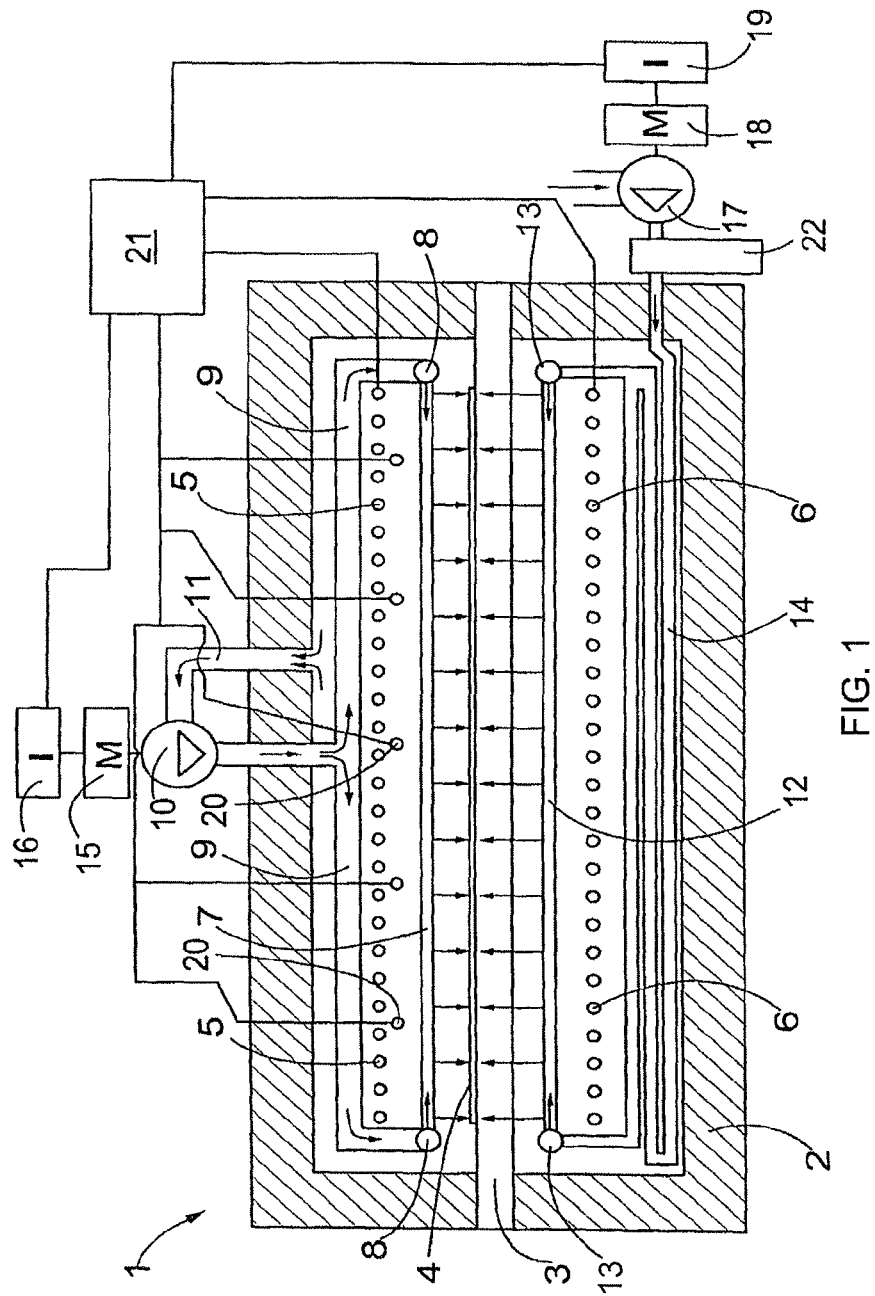
FIG. 1 is a schematic cross-sectional front view showing an apparatus for heating glass.

FIG. 1 is a schematic cross-sectional end view showing a glass tempering furnace 1. The tempering furnace 1 includes a body 2 and rolls 3. During heating taking place in the furnace 1, glass 4 is arranged on the rolls 3. Typically, such rolls 3 are e.g. ceramic rolls. The tempering furnace is provided with upper resistors 5 for heating glass from thereabove, and lower resistors 6 for heating glass from therebelow. In the furnace, the temperature of the glass 4 is raised typically e.g. to 610 to 625° C., depending on the thickness of the glass.

In the glass tempering furnace 1, during heating the glass 4 is moved back and forth, i.e. oscillated, by means of the rolls in a manner known per se in order to enable the support points of the rolls to be distributed evenly all through the entire heating stage, uniformly onto the entire glass 4. This enables deformation errors in the optics of the glass caused by uneven support of the glass to be minimized.

The glass tempering furnace 1 further includes upper side blowpipes 7 to blow air of a temperature preferably more than 600° C. to the upper surface of the glass. The temperature of the air being blown is e.g. approximately 650° C. The upper side blowpipes 7 are arranged transversely in the furnace 1, i.e. they are positioned substantially perpendicularly to the direction of travel of the glass. The air is conveyed through the pipe system to the vicinity of the surface of the glass 4, i.e. the distance between the upper side blowpipes 7 and the surface of the rolls 3 is less than 300 mm, e.g. approximately 80 mm. Furthermore, the distance between the pipes 7 from one another is e.g. approximately 100 to 300 mm. The material of the pipes 7 is e.g. acid-proof steel, and the inner diameter thereof is e.g. 20 mm. The diameter of a blow hole is less than 2.5 mm, typically e.g. approximately 1.5 mm, the distance between the holes from one another being e.g. 25 mm. The blow holes are arranged to alternate such that every second hole blows forwards at an angle of approximately 30° with respect to the perpendicular of the surface of the glass 4, and every second hole blows backwards at an angle of approximately 30° with respect to the perpendicular of the surface of the glass 4. The air is thus blown substantially perpendicularly with respect to the surface of the glass 4, i.e. at an angle less than 45° with respect to the perpendicular of the surface of the glass. The air is fed to the upper side blowpipes from upper side delivery pipes 8. The upper side delivery pipes 8 are arranged at both edges of the furnace 1 longitudinally in the direction of travel of the glass 4. The upper side delivery pipes 8 are arranged at a distance of approximately 50 mm from the surface of the rolls 3. The upper side blowpipes are fastened alternately to the upper side delivery pipes 8, air being fed to the upper side blowpipes alternately from delivery pipes arranged at different edges of the furnace. The diameter of an upper side delivery pipe is e.g. approximately 40 mm.

The air is fed to the upper side delivery pipe 8 by means of an upper side feed pipe 9. The upper side feed pipe may be connected e.g. in to the middle of the upper side delivery pipe 8. On the other hand, e.g. in longer furnaces, more than one upper side feed pipe may be used for each upper side delivery pipe 8.

The air is fed to the pipes by a pressurization unit 10. The pressurization unit 10 sucks hot air from the furnace through an upper side return pipe 11. The pressurization unit 10 sucks air from at least one point inside the furnace. Preferably, air is sucked from a middle line of the furnace 1 at the ceiling of the furnace and from both ends of the furnace. The pressurization unit 10 pressurizes the air mainly by compressing, i.e. by applying the compression principle. The rotation speed of the pressurization unit 10 is more than 15,000 rotations per minute, preferably more than 20,000 rotations per minute, and it may be e.g. a heat endurance compressor or a turbine of a turbocharger. The pressurization unit 10 is used for providing overpressure with respect to the pressure of the furnace 1. Typically, the overpressure is less than 0.25 bar. The rotation speed of the pressurization unit should be sufficiently high in order to enable air to be blown through rather small pipes and nozzle holes at a sufficiently high speed.

The bottom part of the tempering furnace 1 is provided with underside blowpipes 12 arranged transversely in the furnace e.g. in each or in every second roll gap. The underside blowpipes 12 are similar in size compared to the upper side blowpipes 7 and located e.g. approximately 20 mm below the lower surface of the rolls. The blow holes are spaced e.g. at a distance of 25 mm and their hole size is equal to the hole size of the upper side blowpipe. In addition, the holes may be provided with nozzles to ensure that air is blown to the glass without the air flow substantially hitting the rolls 3. In such a case, the rolls 3 are never subjected to uncontrolled heat transfer due to the air flow.

To the underside blowpipes 12 air is supplied from underside delivery pipes 13. The underside delivery pipes 13 are located at both edges of the furnace 1 longitudinally in the direction of travel of the glass. The distance between the underside delivery pipes 13 and the lower surface of the rolls 3 is e.g. approximately 50 mm. The underside blowpipes 12 are fastened alternately to the underside delivery pipes 13 located at different edges of the furnace in a similar manner to that used in connection with the upper side pipes. In other words, air is fed to the underside blowpipe 12 from one or the other of the underside delivery pipes. The diameter of the underside delivery pipes 13 is e.g. approximately 40 mm. Furthermore, the furnace is provided with underside feed pipes 14 to feed air to the underside delivery pipes 13. An underside feed pipe is arranged to wind in the lower part of the furnace so that the air flowing therethrough heats up. The temperature of the air being blown to the underside is also preferably more than 600° C., e.g. approximately 650° C.

In connection with the upper side pressurization unit 10 is provided a drive motor 15, connected to the pressurization unit 10 either through a gear box, or a direct drive may also be used. The drive motor 15 may be e.g. a cage induction motor whose rotation speed is controlled by means of an inverter 16.

Air is blown to the underside feed pipe 14 by a compressor 17. The compressor 17 derives its air from the factory hall. From the compressor 17, the air may be conveyed to a pressure tank 22, in which case the compressor may be smaller than when without the pressure tank. The pressure of the pressure tank may be e.g. 7 bar, and air whose pressure is e.g. 1.5 bar may be supplied from the pressure tank 22 to the furnace. For the sake of clarity, no valves nor adjusters for adjusting the pressure level are shown in the accompanying figures. In addition to or instead of the feed pipe 14 winding in the lower part of the furnace so that the air therein heats up, the air may be heated using a separate heater.

The compressor 17 is rotated by a drive motor 18, which can be a cage induction motor whose rotation speed is controlled by an inverter 19.

The apparatus further comprises thermoelements 20 to measure the temperature of air inside the furnace. On the basis of the measurement carried out by the thermometers 20, resistors 5 and 6 are controlled. The apparatus still further comprises a control unit 21 wherein the necessary measurement information is collected and wherein the desired heating profiles are determined. The control unit 21 is further used for controlling the operation of the pressurization unit 10 and the compressor 17 as well as the resistors 5 and 6.

In the process of heating glass 4, the glass 4 is first transferred to a furnace 1 by means of a loading conveyor. In the furnace 1, the glass 4 is oscillated normally on rolls 3. The temperature of the furnace is set to a temperature of approximately 670° C. When the glass enters the furnace, upper resistors 5 are switched on, according to a predetermined heating profile. Lower resistors are controlled on the basis of thermoelements 20. In a heating profile, heating resistors typically residing in the middle of glass sheets are controlled to operate at a 100% power level while electric resistors residing at the edges of the glass sheets are controlled to operate at a power level lower than this. At the beginning of a heating cycle, upper side convection blowing is set to the maximum. As the heating continues, the upper side convection is gradually decreased.

Figure 2:
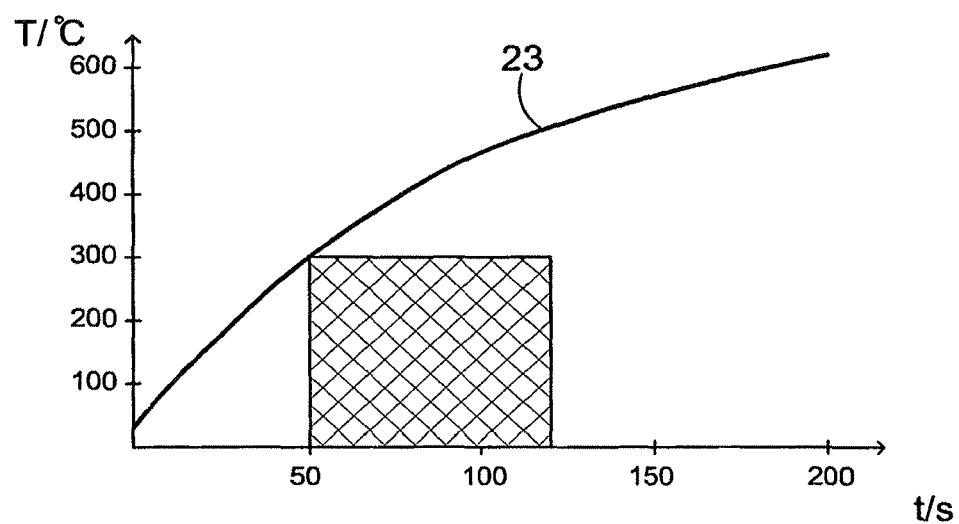
FIG. 2 is a diagram showing temperature development of glass during a heating cycle.

FIG. 2 schematically shows heating of glass during a heating cycle. The horizontal axis shows the heating time while the vertical axis shows the temperature of the glass. The heating curve of the glass is designated by reference number 23. In the case of FIG. 2, at 50 seconds the underside convection blowing is controlled to be switched on, and at the same time lower resistors 6 are switched on using forced control, so that they give out power in accordance with the heating profile and do not follow the control of a thermoelement. This heating involving the blowing on the underside and forced control of the lower resistors continues up to a moment of 120 seconds from the beginning of a heating cycle, whereafter the blowing is stopped and the lower resistors follow the control of the thermoelement. The blowing on the underside and the forced control of the lower resistors have in FIG. 2 been illustrated by a cross-ruled rectangle. The blowing on the underside enables the glass to be subjected to an efficient heat effect. The heat effect achieved by blowing affects quicker than controlling the resistors. However, since rather cold compressor air is conveyed to the lower part of the furnace, the blowing is not continued till the end of the heating cycle in order to prevent the furnace from cooling down too much. On the other hand, the blowing enables the temperature in the lower part of the furnace to be kept reasonably low. Instead of forced control of the lower resistors 6, they may also be controlled in another manner. Preferably, however, the heating effect given by the lower resistors 6 is increased when the blowing on the underside starts.

The upper resistors 5 and the lower resistors 6 are preferably provided with a visible resistor spiral, i.e. the heater is not a "massive heater" wherein the resistor is encapsulated or surrounded in metal. In the present description, a heating cycle refers to the time a single glass loading spends in the furnace; one heating cycle is thus referred to as 100%. The underside heating blowing may be started right at the beginning of the heating cycle but the underside heating blowing is typically started at a moment of 25 to 45% from the starting moment of the heating, and it typically lasts for 25 to 60% of the entire heating time. The underside heating blowing is, however, stopped no later than at a moment which is 80% of the heating cycle.

The drawings and the related description are only intended to illustrate the idea of the invention. The details of the invention may vary within the scope of the claims.

The invention claimed is:

1. An apparatus for heating glass, the apparatus comprising a tempering furnace comprising horizontal rolls arranged to carry the glass and to form a conveyor thereof, an upper side return pipe for sucking air from inside the tempering furnace, a pressurization unit for pressurizing the air sucked from inside the tempering furnace, means for blowing the pressurized air back to an upper surface of the glass, a compressor for pressurizing air taken from outside the furnace, a pipe system for conveying the air pressurized by the compressor to a lower surface of the glass, and means for heating the air pressurized by the compressor.

2. An apparatus as claimed in claim 1, the apparatus further comprising a control unit arranged to control the blowing of pressurized air provided by the compressor on the lower surface of the glass to end before a heating cycle ends and such that the blowing lasts maximally for 60% of an entire heating cycle.

3. An apparatus as claimed in claim 2, the apparatus further comprising lower electric resistors for heating the glass from therebelow, and wherein the control unit is arranged to increase a heating effect given by the lower electric resistors when the blowing on the lower surface of the glass begins.

4. An apparatus as claimed in claim 3, wherein the control unit is arranged to control the lower electric resistors to heat, using forced control, at a power level in accordance with a heating profile simultaneously with the blowing of pressurized air on the lower surface of the glass.

5. An apparatus as claimed in claim 1, the apparatus comprising a pressure tank whereto the pressurized air is conveyed from the compressor and wherefrom the pressurized air is conveyed to the lower surface of the glass.

\* \* \* \* \*